(12) United States Patent
Chen (10) Patent No.: US 8,714,314 B1
(45) Date of Patent: May 6, 2014

(54) LOCKING MECHANISM OF DRAWBAR BRAKING CASTOR

(76) Inventor: Shou-Mao Chen, Taichung (TW)

( * ) Notice: Subject to any disclaimer, the term of this patent is extended or adjusted under 35 U.S.C. 154(b) by 76 days.

(21) Appl. No.: 13/601,086

(22) Filed: Aug. 31, 2012

(51) Int. Cl.
*B60B 33/00* (2006.01)

(52) U.S. Cl.
CPC ......... *B60B 33/0092* (2013.01); *B60B 33/0086* (2013.01)
USPC ......................................... 188/1.12; 16/35 R (58) Field of Classification Search
CPC .................................................. B60B 33/0078
USPC .............................. 188/1.12, 19, 20; 16/35 R
See application file for complete search history.

(56) References Cited

U.S. PATENT DOCUMENTS

| | | | |
|---|---|---|---|
| 2007/0215414 A1* | 9/2007 | Chiang | 188/1.12 |
| 2009/0206565 A1* | 8/2009 | Dull et al. | 280/29 |
| 2010/0077562 A1* | 4/2010 | Block et al. | 16/46 |
| 2011/0083298 A1* | 4/2011 | Yan | 16/31 R |
| 2012/0111672 A1* | 5/2012 | Park | 188/69 |
| 2012/0160617 A1* | 6/2012 | Qi et al. | 188/1.12 |

* cited by examiner

*Primary Examiner* — Christopher Schwartz
(74) *Attorney, Agent, or Firm* — Egbert Law Offices, PLLC (57) ABSTRACT

A locking mechanism of a drawbar braking castor includes an abutting base, an actuating space, a pressing member, a transverse sliding seat, a round ear ring, an embedded locking frame, a first resetting assembly, a spacing base, a flexible inhaul cable, a variable driving member and a second resetting assembly. When the transverse sliding seat is pressed downwards by the extensible drawbar, the embedded locking frame is pulled to move via the flexible inhaul cable, such that the locating flange of the gear ring could be interlocked by the embedded portion. Hence, the locking mechanism of the drawbar braking castor could be adapted to various mobile drawbar carriers with a spacing between the castors and extensible drawbars, significantly improving applicability of the products.

8 Claims, 10 Drawing Sheets

LOCKING MECHANISM OF DRAWBAR BRAKING CASTOR

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a locking mechanism of a drawbar braking castor, and more particularly to an innovative one which could be applied to mobile drawbar carriers with a spacing between the castor and drawbars.

2. Description of Related Art Including Information Disclosed Under 37 CFR 1.97 and 37 CFR 1.98

Generally, easy-rolling castors are installed onto the bottom of suitcases, allowing the users to drag the suitcases via drawbars easily and conveniently. However, when the users lay their luggage suitcases aside (e.g., making a phone call or going to the bathroom), the luggage suitcases may slide away. For these reasons, a braking mechanism of castors has been developed for suitcases.

The conventional brake structure is usually designed in a way that the bottom of the extensible drawbars is extended into a horizontal spacing of the castor, so a horizontal driving member could be pressed by the bottom of the extensible drawbars to drive the locking member for abutting onto the castor and locking it accordingly. Yet, in order to reduce the weight of the users' luggage and manufacturing cost, the lightweight luggage suitcases have been gradually developed. The abutting base at bottom of the extensible drawbar is generally set upwards so as to diminish the connecting part of abutting base and castor as well as the extensible drawbars' material cost, leading to the brake of conventional casters unsuitable for this structure. Hence, this requires to develop an ideal, practical and innovative locking mechanism of castors with respect to this kind of suitcase structure.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

Based on the innovative structural design of the present invention wherein "the locking mechanism of drawbar braking caster" comprises: abutting base, actuating space, pressing member, transverse sliding seat, round gear ring, embedded locking frame, first resetting assembly, spacing base, flexible inhaul cable, variable driving member and second resetting assembly, when the transverse sliding seat is pressed downwards by the extensible drawbar, the embedded locking frame is pulled to move via the flexible inhaul cable, such that the locating flange of the gear ring could be interlocked by the embedded portion. Hence, the locking mechanism of the drawbar braking castor could be adapted to various mobile drawbar carriers with a spacing between the castors and extensible drawbars, significantly improving the products' applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

FIGS. 1-4 depict preferred embodiments of the locking mechanism of the present invention for a drawbar braking castor, which, however, are provided for only explanatory objective for patent claims. Said locking mechanism of drawbar braking castor is set between the extensible drawbar 02 and castor 03 of a mobile drawbar carrier 01, so as to control the locking and releasing state of the castor 03. The castor 03 is set on the bottom of the mobile drawbar carrier 01, and composed of a castor seat 04 and a castor body 05 pivoted at bottom of the castor seat 04.

Said locking mechanism of a drawbar braking castor comprises an abutting base 10, set on the rear side of the mobile drawbar carrier 01. Said extensible drawbar 02 is extended upwards into the abutting base 10.

Figure 4:
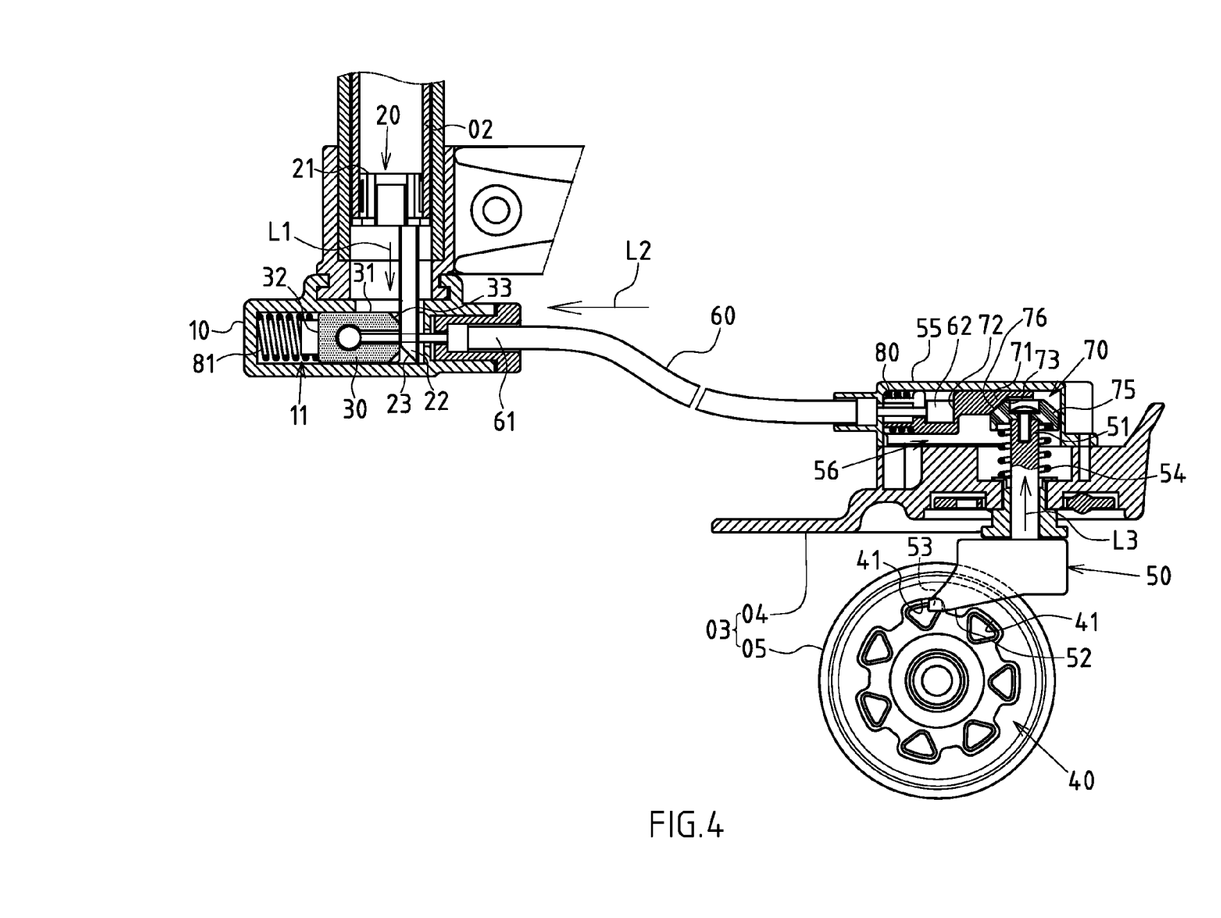
FIG. 4 is an actuating status view of the preferred embodiment of the present invention.

An actuating space 11 is formed in the abutting base 10 and connected with the bottom of extensible drawbar 02, allowing the bottom of the extensible drawbar 02 to be extended into the actuating space in a declining state (shown in FIG. 4).

A pressing member 20 is connected with the bottom of extensible drawbar 02 and comprises of an assembling end 21 and a pressing end 22. Of which, the pressing end 22 is provided with a first oblique surface 23.

A transverse sliding seat 30 is set into the actuating space 11 and comprises of a pressed side 31 and an actuating side 32. Of which, a second oblique surface 33 is located on the pressed side 31 correspondingly to the first oblique surface 23 of the pressing member 20, so that when the extensible drawbar 02 is pressed downwards, the first oblique surface 23 of the pressing member 20 could be correspondingly abutted onto the second oblique surface 33, allowing the transverse sliding seat 30 to transversely slide towards the actuating side 32 (shown in FIG. 4).

A round gear ring 40 is set on one side or periphery of the castor body 05 of the castor 03. The gear ring 40 is defined to form locating flanges 41 annularly arranged at interval.

Figure 3:
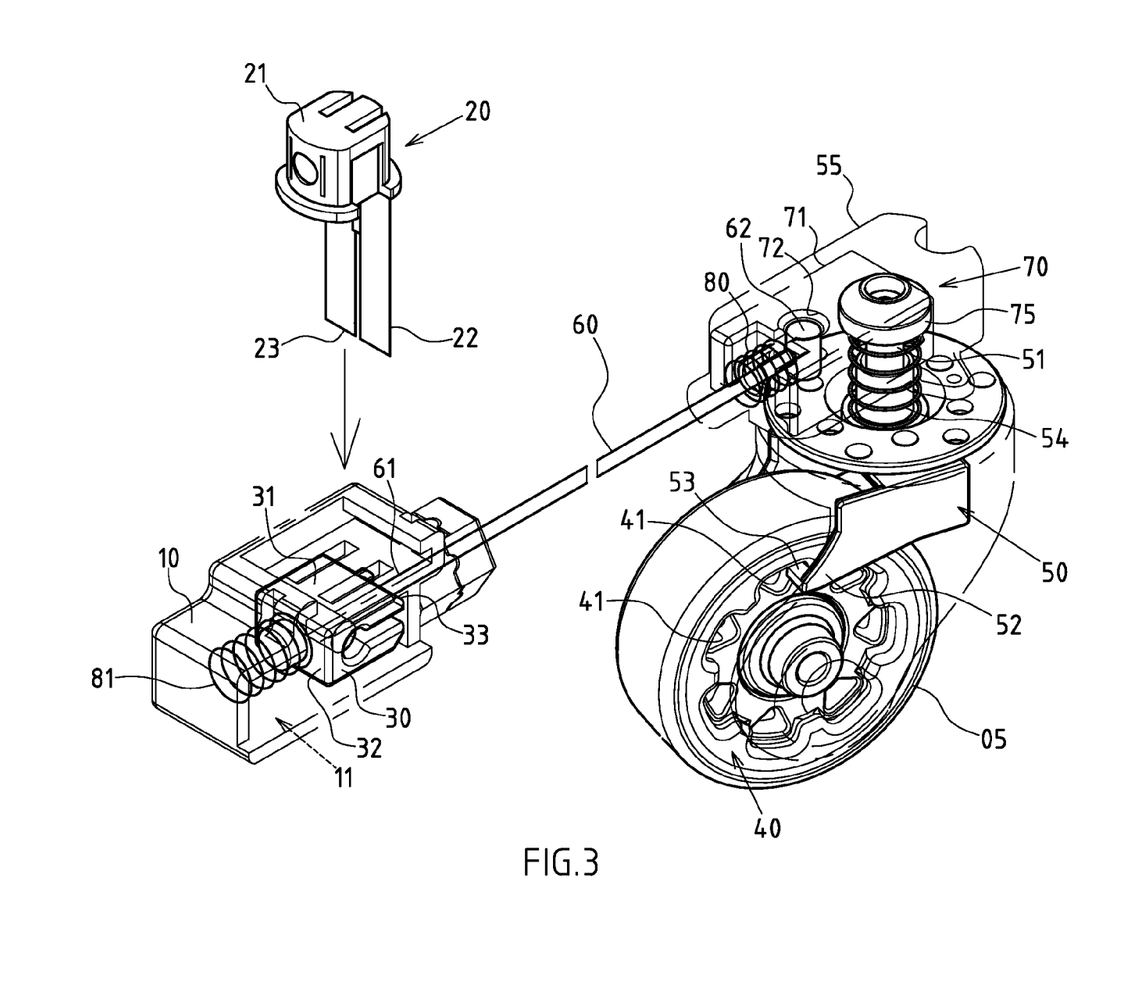
FIG. 3 is an assembled perspective view of the preferred embodiment of the present invention.

An embedded locking frame 50 is assembled vertically onto the castor seat 04 in a lifting state. The embedded locking frame 50 comprises of a top end 51 and an embedded end 52, of which the top end 51 is protruded out of the castor seat 04, and the embedded end 52 is provided with an embedded portion 53 opposite to the locating flange 41 of the round gear ring 40. Referring to FIG. 3, the embedded portion 53 of the embedded locking frame 50 is made of lugs located on one side of the embedded end 52 of the embedded locking frame 50.

A first resetting assembly 54 is set correspondingly to the embedded locking frame 50, so that the embedded locking frame 50 could be flexibly reset.

A spacing base 55 is located on the top end 51 of the embedded locking frame 50, where a holding space 56 is formed.

A flexible inhaul cable 60 is provided and comprises of a pulled end 61 and a pulling end 62. Of which, the pulled end 61 is connected with the transverse sliding seat 30. The pulling end 62 is penetrated into the holding space 56 of the spacing base 55.

A variable driving member 70 is installed into the holding space 56 of the spacing base 55 and connected with the pulling end 62 of the flexible inhaul cable 60. The pulling or release force of flexible inhaul cable 60 could be transformed to the lifting force for driving the embedded locking frame 50 by the variable driving member 70.

A second resetting assembly 80 is set on the spacing base 55 correspondingly to the variable driving member 70, enabling flexible resetting of the variable driving member 70 under the pulling of the flexible inhaul cable 60. Referring to FIG. 3, a third resetting assembly 81 is located between the abutting base 10 and the actuating side 32 of the transverse sliding seat 30, so as to enhance the flexible resetting function of the flexible inhaul cable 60 under pulling. Said first, second and third resetting assemblies 54, 80, 81 could be implemented by springs.

Figure 1:
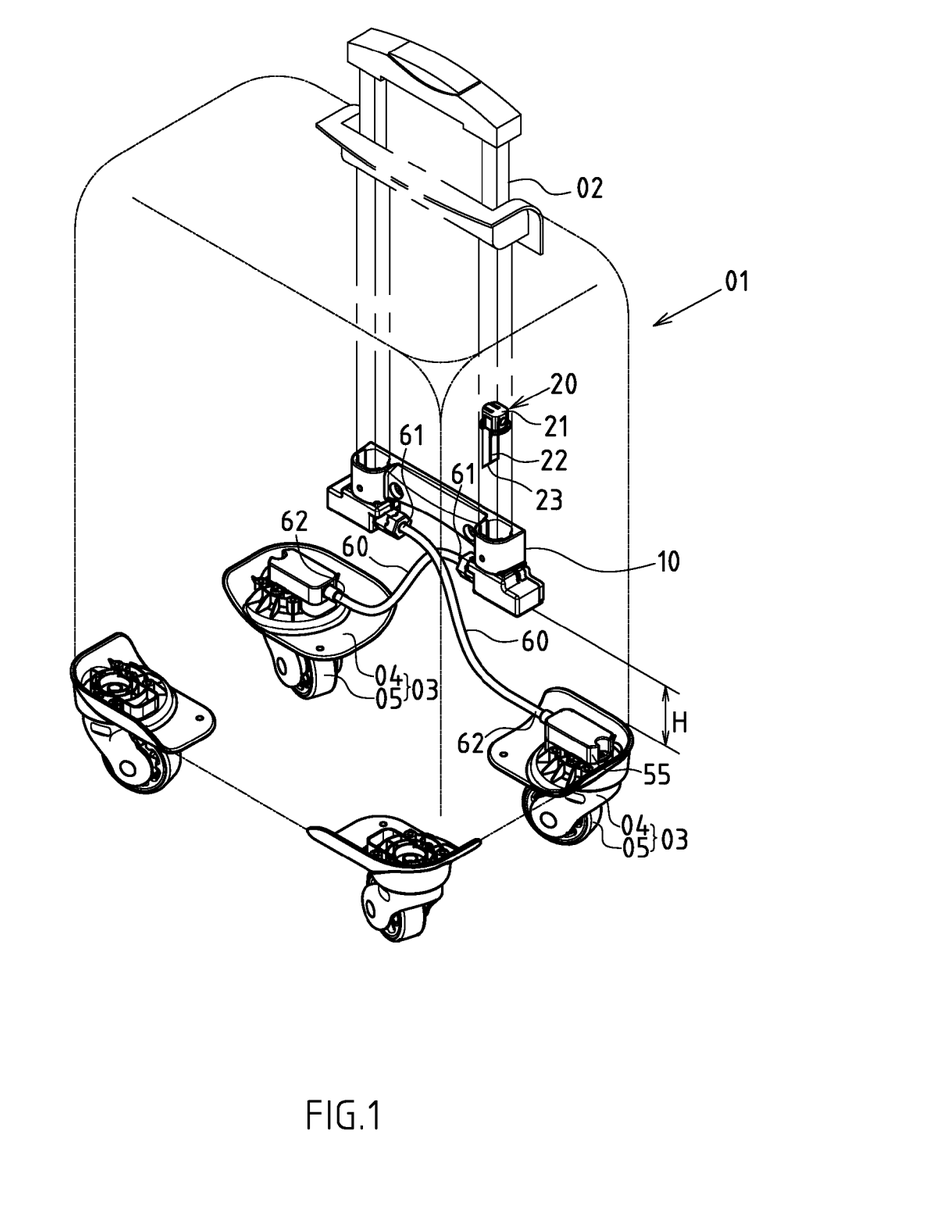
FIG. 1 is an assembled 3D view of the preferred embodiment of the present invention.
Figure 2:
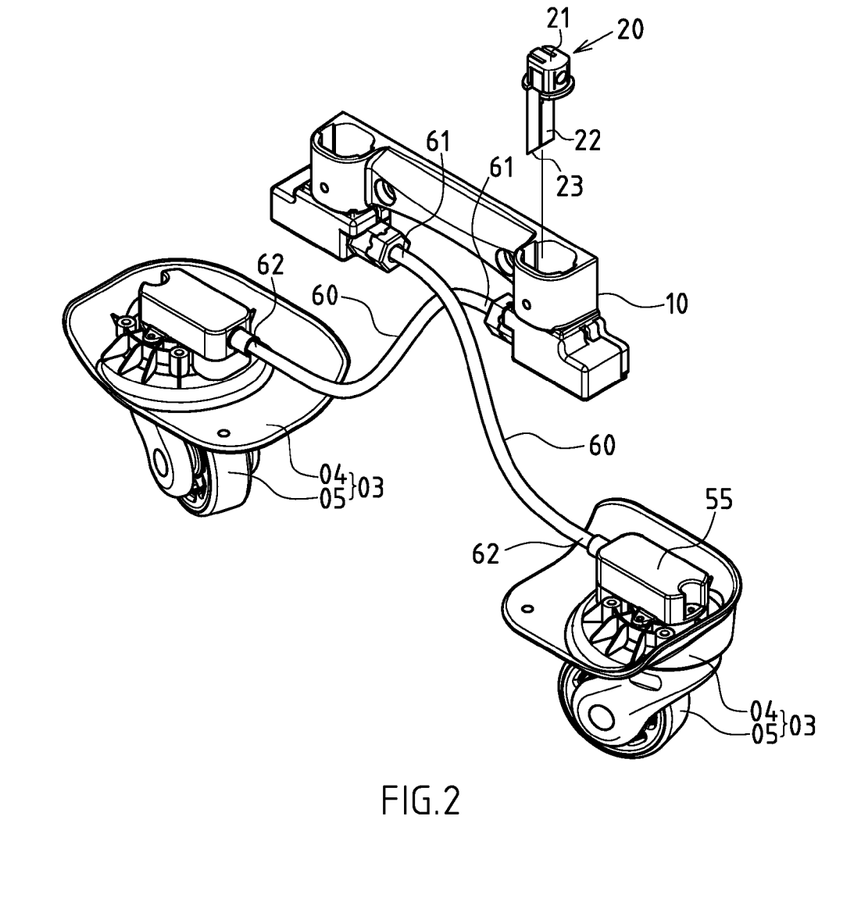
FIG. 2 is an enlarged 3D view wherein the present invention and the castor are assembled together.

Referring to FIG. 1, the extensible drawbar 02 could be of a double-bar pattern. The flexible inhaul cables 60 are connected with the transverse sliding seat 30 and variable driving member 70 at opposite side (shown in FIG. 3), so that the flexible inhaul cables 60 are formed into an interlaced pattern. No matter where the abutting base 10 is located on the rear side of the mobile drawbar carrier 01, the transverse sliding seat 30 and variable driving member 70 could be connected via the flexible inhaul cable 60 for locking the castor 03.

Figure 5:
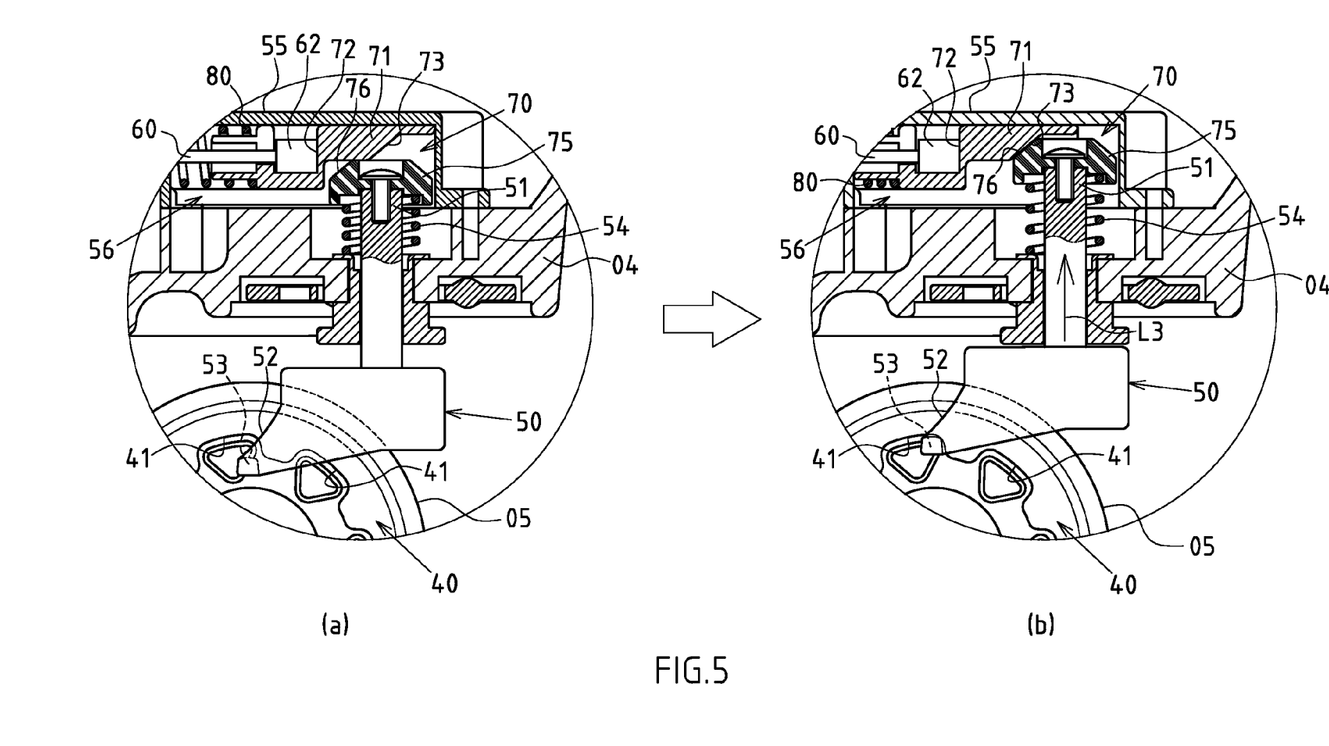
FIG. 5 is an enlarged actuating view of the castor in FIG. 4.

Based on above-specified structural design, the present invention is operated as follows:

Referring to FIGS. 3 and 4, the round gear ring 40 could be designed into a hollow ring pattern. Said locating flange 41 is annularly arranged at interval on the inner periphery of the round gear ring 40. The variable driving member 70 comprises of a transverse sliding block 71 and a vertical actuating block 75. Of which, the transverse sliding block 71 comprises of an embedded portion 72 and an oblique guide end 73. Said embedded portion 72 is used for embedding and positioning of the pulling end 62 of the flexible inhaul cable 60. The vertical actuating block 75 is positioned on the top end 51 of the embedded locking frame 50, and provided with an oblique guide surface 76 arranged at interval correspondingly to the oblique guide end 73 of the transverse sliding block 71. The bottom surface of the transverse sliding block 71 is normally abutted onto the top surface of the vertical actuating block 75 (shown in FIG. 5(a)), allowing the first resetting assembly 54 to continuously accumulate elasticity. Hence, when the transverse sliding seat 30 is pressed downwards by the extensible drawbar 02 (shown by arrow L1 in FIG. 4), the first oblique surface 23 of the pressing member 20 could oppositely press the second oblique surface 33, allowing the transverse sliding seat 30 to horizontally slide towards the actuating side 32 and synchronously pull (shown by arrow L2) the flexible inhaul cable 60. This could generate a pulling force to the transverse sliding block 71, so that the vertical actuating block 75 along with the embedded locking frame 50 could be bounced with the accumulated elastic force of the first resetting assembly 54 (shown by arrow L3 in FIG. 4 and FIG. 5(b)), permitting the oblique guide surface 76 to correspondingly touch the oblique guide end 73 of the transverse sliding block 71. So, the locating flange 41 of the round gear ring 40 could be interlocked by upward movement of the embedded portion 53 to lock the castor 03 (shown in FIG. 5(b)). When the extensible drawbar 02 is pulled upwards, the transverse sliding block 71 could be released, and the oblique guide surface 76 of the vertical actuating block 75 is extruded by the oblique guide end 73 of the transverse sliding block 71 via the elastic pushing effect of the second and third resetting assemblies 80, 81, so that the embedded locking frame 50 moves downwards, and the castor 03 is released if the embedded portion 53 is reset correspondingly to the locating flange 41 of the castor 03 (shown in FIG. 5(a)).

Figure 6:
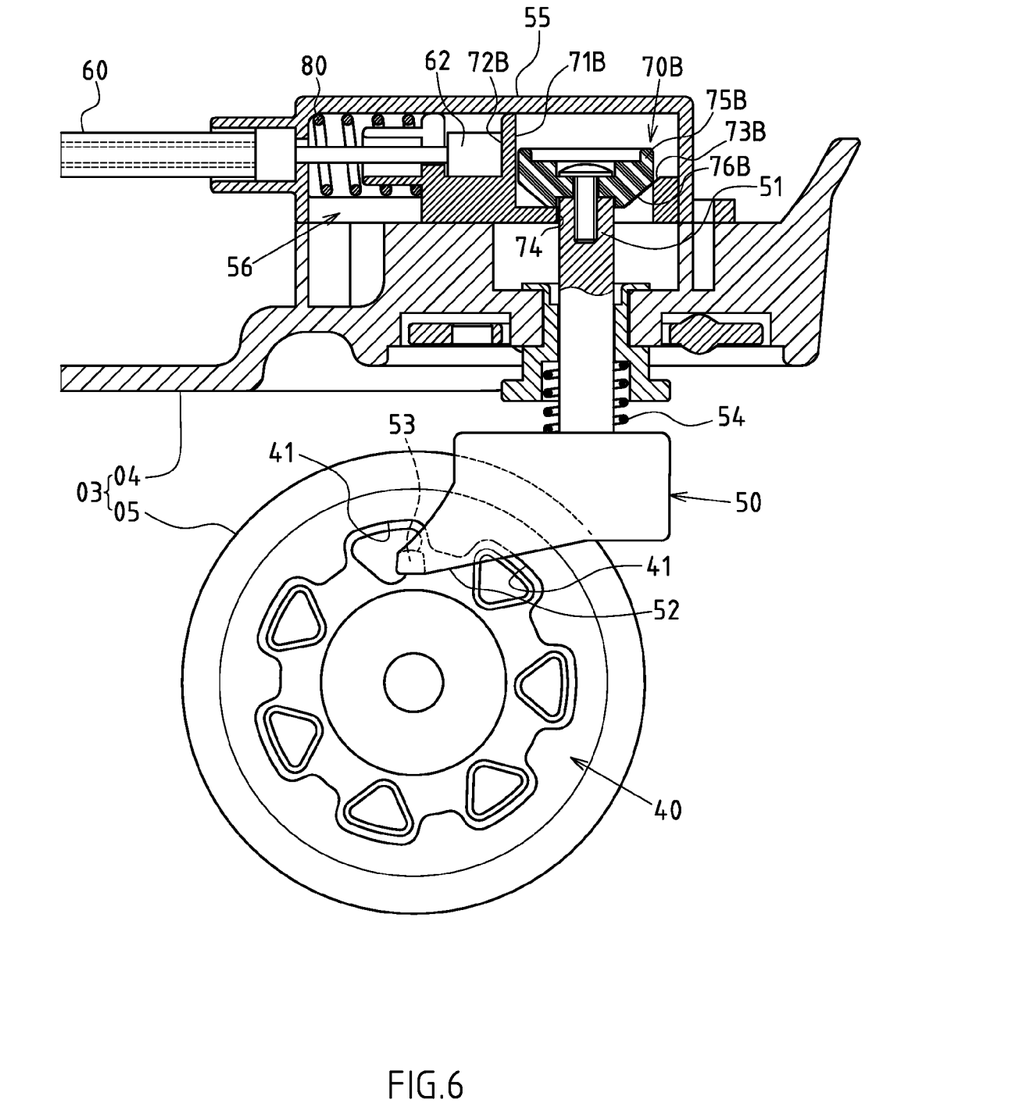
FIG. 6 is another application view of the variable driving member of the present invention.
Figure 7:
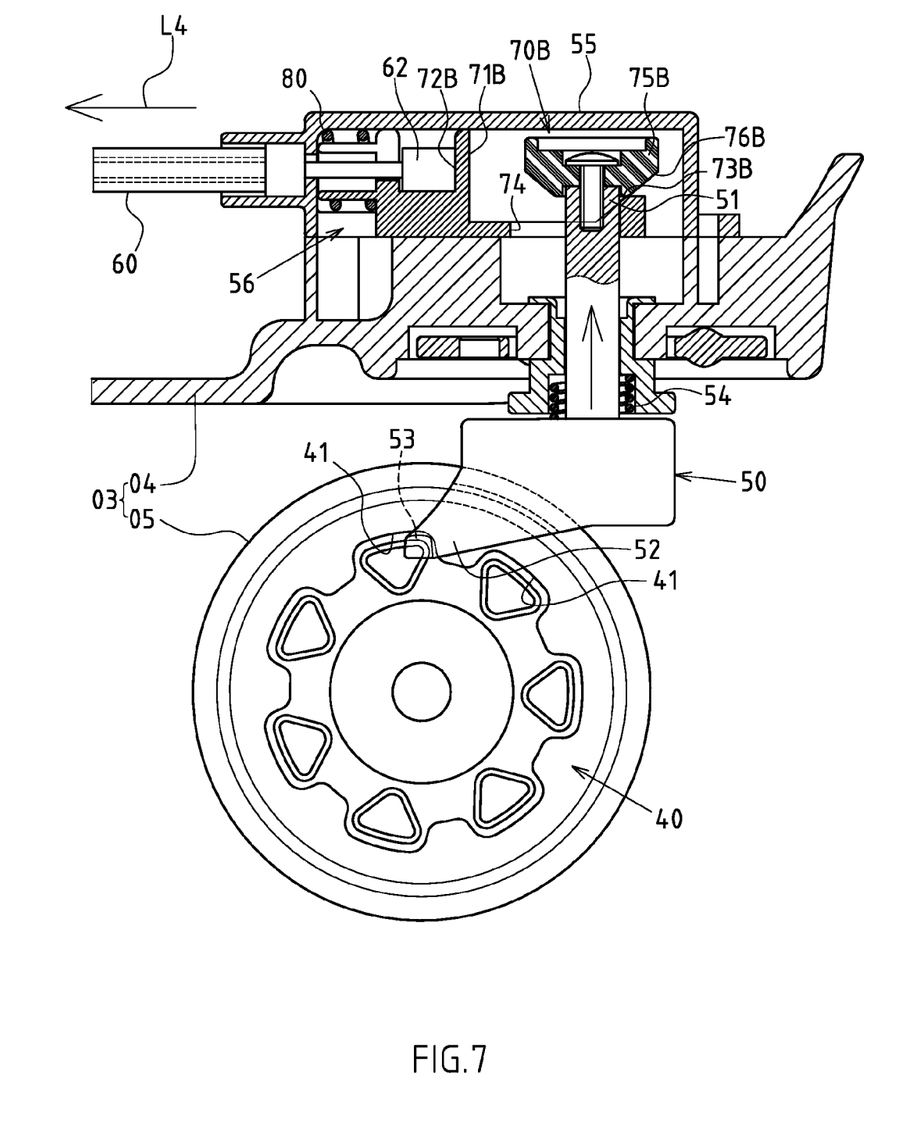
FIG. 7 is an actuating view of FIG. 6.

Or, referring to FIG. 6, the round gear ring 40 could be designed into a hollow ring pattern. Said locating flange 41 is annularly arranged at interval on the inner periphery of the round gear ring 40. The variable driving member 70B comprises of a transverse sliding block 71B and a vertical actuating block 75B; of which, the transverse sliding block 71B comprises of an embedded portion 72B, an oblique guide end 73B and a through-hole 74 located between the embedded portion 72B and the oblique guide end 73B. Of which, said embedded portion 72B is used for embedding and positioning of the pulling end 62 of the flexible inhaul cable 60, and the through-hole 74 is used for extension and penetration from the top end 51 of the embedded locking frame 50. The vertical actuating block 75B is positioned on the top end 51 of the embedded locking frame 50, and provided with an oblique guide surface 76B at bottom correspondingly to the oblique guide end 73B. Thus, referring to FIG. 7, when the transverse sliding block 71B is pulled by the flexible inhaul cable 60 (shown by arrow L4) to move laterally (referring to the relative position of the transverse sliding block 71B in FIG. 6), the oblique guide surface 76B of the vertical actuating block 75B could be extruded by the oblique guide end 73B of the transverse sliding block 71B to generate a lifting force. This allows the embedded locking frame 50 to move upwards, and the castor 03 is locked if the embedded portion 53 simultaneously moves upwards to interlock the locating flange 41 (shown in FIG. 5(a)).

Figure 8:
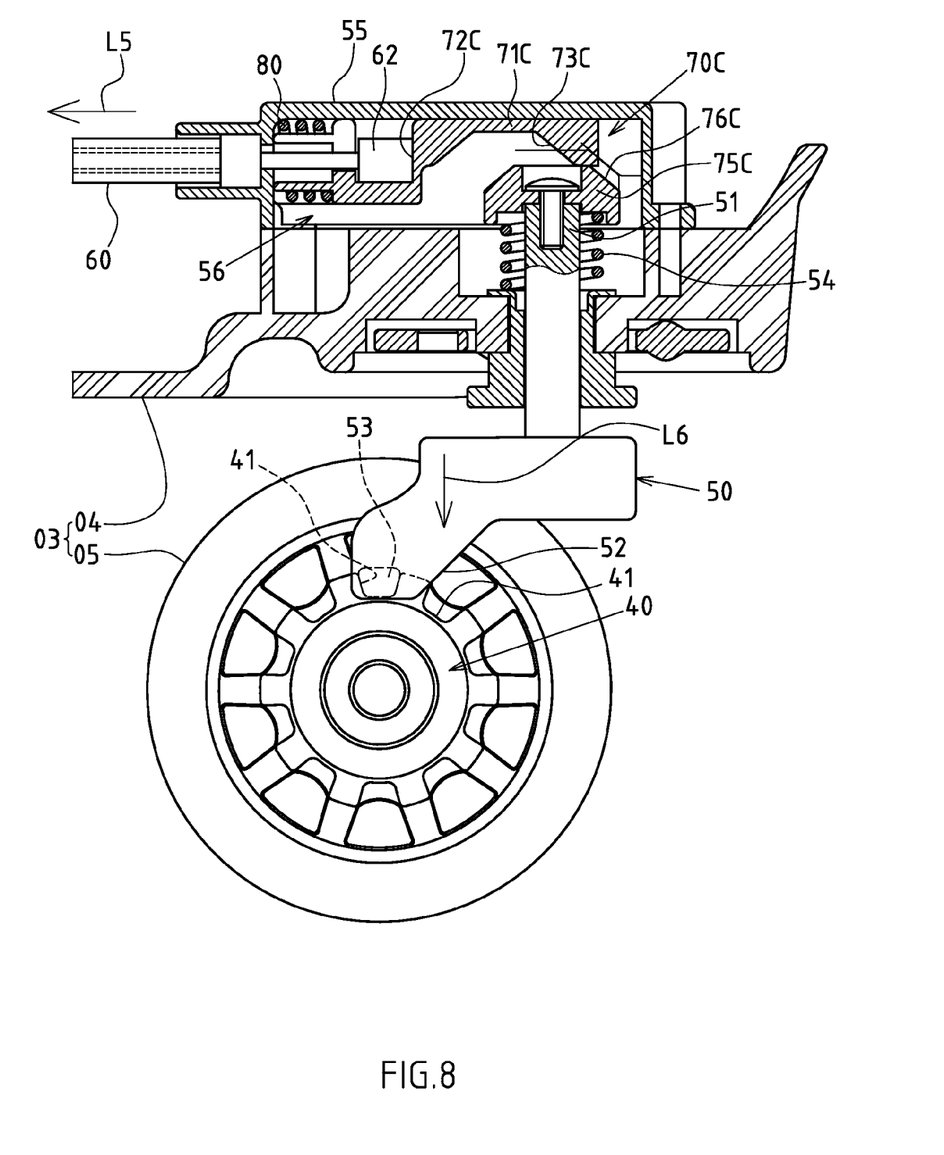
FIG. 8 is another application view of the variable driving member of the present invention.
Figure 9:
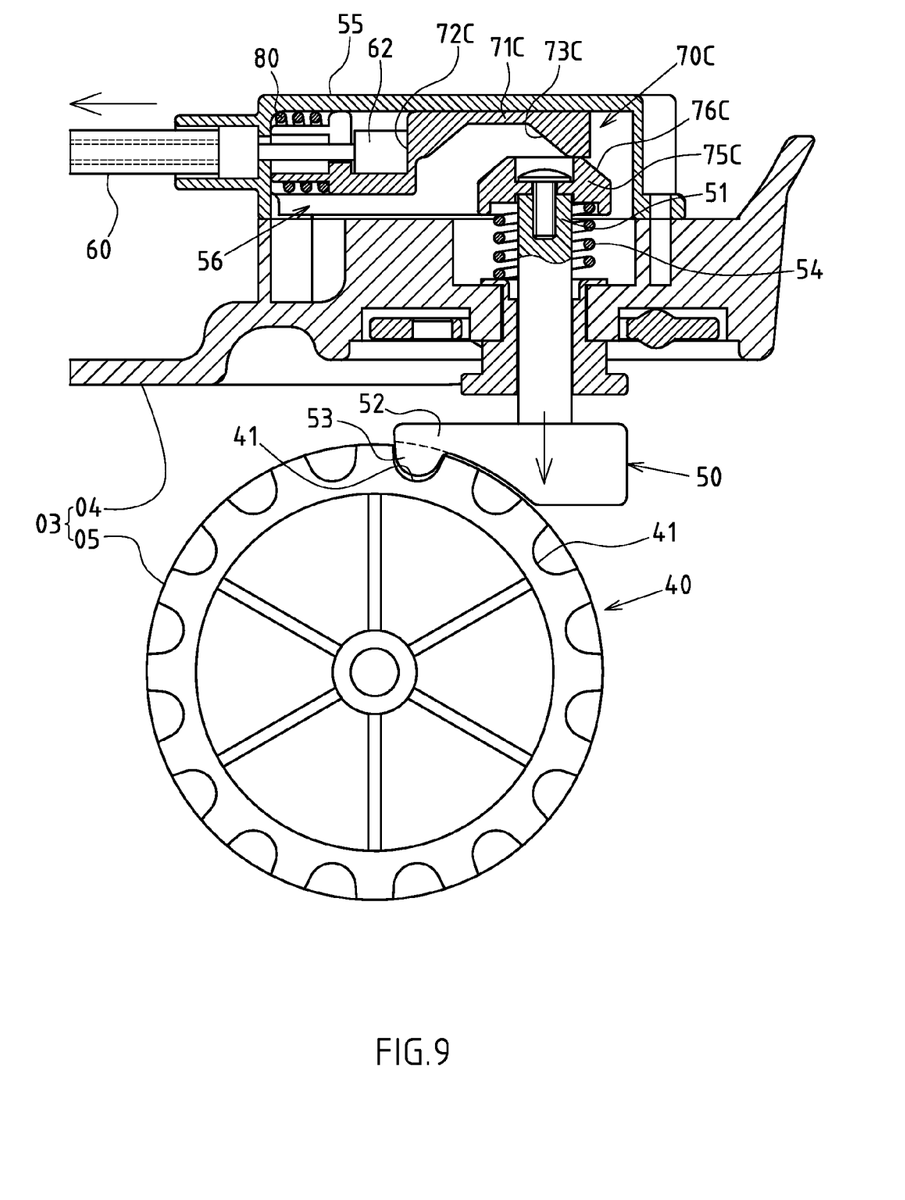
FIG. 9 is an application view of the present invention wherein the round gear ring is set on the periphery of the castor body.
Figure 10:
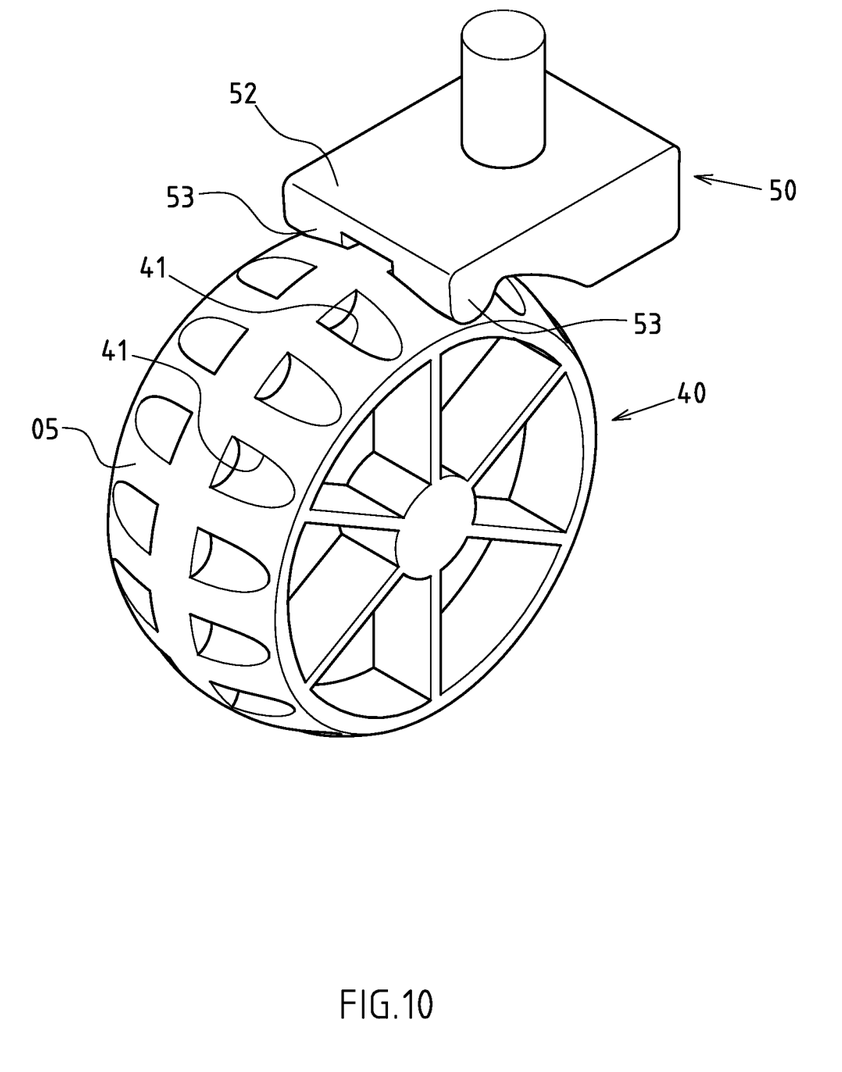
FIG. 10 is a partial perspective view of FIG. 9 wherein the locating flange of the round gear ring is embedded by the embedded portion.

Or, referring to FIG. 8, the round gear ring 40 could be co-axially designed into a ring pattern located on one side of the castor body 05, and said locating flange 41 is arranged at interval on the periphery of the round gear ring 40. The variable driving member 70C comprises of a transverse sliding block 71C and a vertical actuating block 75C. Of which, the transverse sliding block 71C comprises of an embedded portion 72C and an oblique guide end 73C. Said embedded portion 72C is used for embedding and positioning of the pulling end 62 of the flexible inhaul cable 60. The vertical actuating block 75C is positioned on the top end 51 of the embedded locking frame 50. The oblique guide end 73C is extended beyond the top end of the vertical actuating block 75C. An oblique guide surface 76C is arranged on the vertical actuating block 75C correspondingly to the oblique guide end 73C, such that the oblique guide end 73C gets into touch with the oblique guide surface 76C. Thus, when the transverse sliding block 71C is pulled by the flexible inhaul cable 60 (shown by arrow L5) to move laterally, the oblique guide surface 76C of the vertical actuating block 75C could be extruded by the oblique guide end 73C of the transverse sliding block 71C to generate a lifting force, allowing the embedded locking frame 50 to move downwards and lock the castor 03 if the embedded portion 53 simultaneously moves downwards (shown by arrow L6) to interlock the locating flange 41 of the round gear ring 40. Or referring to FIGS. 9 and 10, the round gear ring 40 is set on the periphery of the castor body 05, and said locating flange 41 is formed at interval on the periphery of the round gear ring 40, so the castor 03 could be locked similarly if the embedded portion 53 moves downwards to interlock the locating flange 41 of the round gear ring 40. It can be seen that the castor 03 could be locked by all above-specified three embodiments of the variable driving member.

Referring to FIG. 1, the present invention could not only be applied to a mobile drawbar carrier 01 wherein the abutting base 10 and the castor 03 are configured at interval and provided with a vertical spacing H. The present invention could also be applied to a prior art wherein the abutting base 10 and the castor 03 are horizontally configured at interval for improved applicability.

I claim:

1. A locking mechanism of a drawbar braking castor, set between the extensible drawbar and castor of a mobile drawbar carrier, so as to control the locking and releasing state of the castor; the castor is set on the bottom of the mobile drawbar carrier, and composed of a castor seat and a castor body pivoted at bottom of the castor seat; said locking mechanism of drawbar braking castor comprising:

an abutting base, set on the rear side of the mobile drawbar carrier; said extensible drawbar is extended upwards into the abutting base;

an actuating space, formed in the abutting base and connected with the bottom of extensible drawbar, allowing the bottom of the extensible drawbar to be extended into the actuating space in a declining state;

a pressing member, connected with the bottom of extensible drawbar, comprising of a assembling end and a pressing end; of which the pressing end is provided with a first oblique surface;

a transverse sliding seat, set into the actuating space, comprising of a pressed side and an actuating side; of which, a second oblique surface is located on the pressed side correspondingly to the first oblique surface of pressing member, so that when the extensible drawbar is pressed downwards, the first oblique surface of the pressing member could be correspondingly abutted onto the second oblique surface, allowing the transverse sliding seat to transversely slide towards the actuating side;

a round gear ring, set on one side or periphery of the castor body of the castor; the gear ring is defined to form locating flanges annularly arranged at interval;

an embedded locking frame, assembled vertically onto the castor seat in a lifting state; the embedded locking frame comprises of a top end and an embedded end, of which the top end is protruded out of the castor seat, and the embedded end is provided with an embedded portion opposite to the locating flange of the round gear ring;

a first resetting assembly, set correspondingly to the embedded locking frame, so that the embedded locking frame could be flexibly reset;

a spacing base, located on the top end of the embedded locking frame, where a holding space is formed;

a flexible inhaul cable, comprising of a pulled end and a pulling end; of which, the pulled end is connected with the transverse sliding seat; and the pulling end is penetrated into the holding space of the spacing base;

a variable driving member, installed into the holding space of the spacing base and connected with the pulling end of the flexible inhaul cable; the pulling or release force of flexible inhaul cable could be transformed to the lifting force for driving the embedded locking frame by the variable driving member;

a second rescuing assembly, set on the spacing base correspondingly to the variable driving member, enabling flexible resetting of the variable driving member under the pulling of the flexible inhaul cable;

when the extensible drawbar is pressed downwards on the transverse sliding seat, the variable driving member is pushed to drive the embedded locking frame via the flexible inhaul cable, such that the locating flange of round gear ring could be interlocked by the embedded portion.

2. The structure defined in claim 1, wherein the round gear ring is set on one side or periphery of the castor body of the castor, and said locating flange is annularly arranged at interval on the inner periphery of the round gear ring; the variable driving member comprises of a transverse sliding block and a vertical actuating block; of which, the transverse sliding block comprises of an embedded portion and an oblique guide end; said embedded portion is used for embedding and positioning of the pulling end of the flexible inhaul cable; the vertical actuating block is positioned on the top end of the embedded locking frame and provided with an oblique guide surface arranged at interval correspondingly to the oblique guide end of the transverse sliding block; the bottom surface of the transverse sliding block is normally abutted onto the top surface of the vertical actuating block.

3. The structure defined in claim 1, wherein the round gear ring has a hollow ring pattern on one side of the castor body; said locating flange is annularly arranged at interval on the inner periphery of the round gear ring; the variable driving member comprises of a transverse sliding block and a vertical actuating block; of which, the transverse sliding block comprises of an embedded portion, an oblique guide end and a through-hole located between the embedded portion and the oblique guide end; of which, said embedded portion is used for embedding and positioning of the pulling end of the flexible inhaul cable, and the through-hole is used for extension and penetration of the top end of the embedded locking frame; the vertical actuating block is positioned on the top end of the embedded locking frame and provided with an oblique guide surface arranged at interval correspondingly to the oblique guide end.

4. The structure defined in claim 1, wherein the round gear ring could be co-axially configured in a ring pattern located on one side of the castor body, and said locating flange is arranged at interval on the periphery of the round gear ring; or the round gear ring is set on the periphery of the castor body and said locating flange is formed at interval on the periphery of the round gear ring; of which, the variable driving member comprises of a transverse sliding block and a vertical actuating block; of which the transverse sliding block comprises of an embedded portion and an oblique guide end; said embedded portion is used for embedding and positioning of the pulling end of the flexible inhaul cable; the vertical actuating block is positioned on the top end of the embedded locking frame; the oblique guide end is extended beyond the top end of the vertical actuating block; an oblique guide surface is arranged on the vertical actuating block correspondingly to the oblique guide end, such that the oblique guide end gets into touch with the oblique guide surface.

5. The structure defined in claim 1, wherein the extensible drawbar has a double-bar pattern; and said the flexible inhaul cables are connected with the transverse sliding seat and variable driving member at opposite side, so that the flexible inhaul cables are formed into an interlaced pattern.

6. The structure defined in claim 1, wherein a third resetting assembly is set between the abutting base and the actuating side of the transverse sliding seat.

7. The structure defined in claim 1, wherein the embedded portion of the embedded locking frame is made of lugs set at one side of the embedded end of the embedded locking frame.

8. The structure defined in claim 1, wherein the abutting base and the castor are configured at interval to form a vertical spacing.

* * * * *